(12) United States Patent
Smith et al.

(10) Patent No.: US 8,973,300 B1
(45) Date of Patent: Mar. 10, 2015

(54) TRAP FOR CRAWLING INSECTS

(75) Inventors: John Douglas Smith, Orlando, FL (US);
Mark Naylor, Minneola, FL (US);
Jeffrey Norman Vahle, Windermere, FL (US); Tanya Peak Smith, Groveland, FL (US); L. Keith Forbis, Yalaha, FL (US)

(73) Assignee: Disney Enterprises, Inc., Burbank, CA (US)

( * ) Notice: Subject to any disclaimer, the term of this patent is extended or adjusted under 35 U.S.C. 154(b) by 471 days.

(21) Appl. No.: 13/443,091

(22) Filed: Apr. 10, 2012

(51) Int. Cl.
*A01M 1/20* (2006.01)

(52) U.S. Cl.
USPC .............. 43/144; 43/107; 43/121; 43/132.1

(58) Field of Classification Search
CPC ... A01M 1/023; A01M 1/103; A01M 1/2011; A01M 1/2077
USPC ........... 43/59, 107, 112, 121, 123, 132.1, 144
See application file for complete search history.

(56) References Cited

U.S. PATENT DOCUMENTS

| | | | | |
|---|---|---|---|---|
| 115,215 | A * | 5/1871 | Keep | 43/121 |
| 1,672,576 | A * | 6/1928 | Meyer | 43/121 |
| 2,722,081 | A * | 11/1955 | Heffner | 43/121 |
| 4,263,740 | A * | 4/1981 | Hemsarth et al. | 43/114 |
| 4,423,564 | A * | 1/1984 | Davies et al. | 43/121 |
| 4,953,320 | A * | 9/1990 | Nelson | 43/121 |
| 5,148,626 | A * | 9/1992 | Haake, Sr. | 43/121 |
| 5,926,999 | A * | 7/1999 | Vernon et al. | 43/121 |
| 2009/0145019 | A1 * | 6/2009 | Nolen et al. | 43/121 |
| 2011/0047860 | A1 * | 3/2011 | Black et al. | 43/123 |

OTHER PUBLICATIONS

Silvandersson, "Bed Bug Dome or Bug Dome," Silvatronic, a Personal Bed Bug Monitor, based in Sweden, Stern Environmental Group, www.SternEnvironmental.com, dated Oct. 20, 2009.
"NightWatch Bed Bug Monitor Trap," from BioSensory Inc., www.biosensory.com, Putnam, CT, Apr. 2009.
Bed Bug Traps & Monitors, http://www.domyownpestcontrol.com/bed-bug-traps-c-39_209.html; retrieved Mar. 5, 2012.

* cited by examiner

*Primary Examiner* — Christopher P Ellis
(74) *Attorney, Agent, or Firm* — Marsh Fischmann & Breyfogle LLP; Kent A. Lembke

(57) ABSTRACT

An insect trap for use in trapping and exterminating crawling insects including bed bugs. The trap includes a pit fall trap assembly with sidewalls defining a pit or well and a heat source positioned within the pit. The trap includes a controller assembly with a controller selectively operating the heat source, which includes a base plate provided at a bottom of the pit. In this way, the base plate provides the floor or lower surfaces of the pit upon which insects fall and also to which the insects are attracted by the thermal lure of the heat source. The inner surfaces preferably include a layer of anti-traction material (such as UHMW tape or the like) such that the insects cannot climb back out of the pit. The controller operates to alternate the heat source between a lure temperature mimicking a blood host and a higher temperature to exterminate trapped insects.

16 Claims, 3 Drawing Sheets

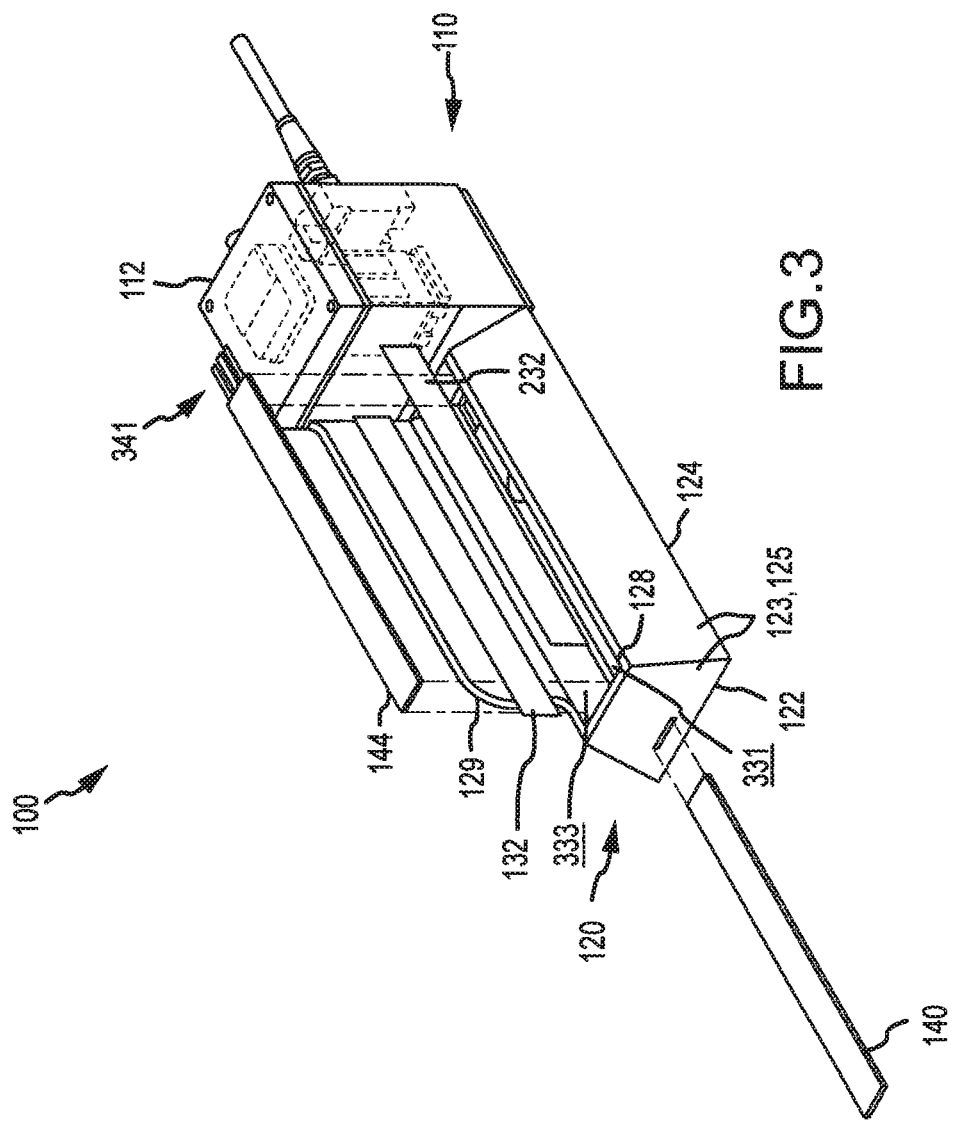

TRAP FOR CRAWLING INSECTS

BACKGROUND

1. Field of the Description

The present description relates, in general, to methods and devices for trapping insects that do not fly or jump (i.e., crawling insects) such as bed bugs, and, more particularly, to an insect trap for use in capturing and also killing parasitic and/or biting insects, e.g., bed bugs and other non-flying insects and/or non-jumping insects.

2. Relevant Background

An ongoing concern is how to best control and, preferably, eliminate many insects from homes, apartment buildings, and hotels and, particularly, to remove insects from places where people sleep. For example, bed bugs are parasitic insects that feed on human blood and are mainly active at night. Since 1995, bed bug infestations of human habitats has been on the increase such that there has recently been an increase in demand for effective methods for detecting and then eliminating bed bugs from resorts, hotels, apartments, and other human dwellings.

Bed bugs do not have wings but are one of many insects that are non-flying and, for the most part, non-jumping insects. Bed bugs are relatively small growing to 4 to 5 millimeters in length. Bed bugs are nocturnal bloodsucking insects (i.e., parasitic insects) and will prey on humans when other prey is not available. Studies have indicated that bed bugs may be attracted to their blood hosts by warmth (e.g., temperatures in ranges of typical prey skin temperatures or even temperatures of skin with underlying blood flow), by carbon dioxide (breath of likely prey), and by certain chemicals (odor attractants such as pheromones released by a host).

Many insect traps have been developed to attempt to capture bed bugs. In the most simplistic form, insect traps with pitfalls are available that provide a tray for placing under each leg or post of a bed. These leg post-based traps generally are designed to have a center well with steep/vertical sidewalls for receiving the bed post and making it difficult for any trapped bed bugs from climbing up to reach the bedpost. The leg post-based trap also includes an outer pitfall, defined by an outer wall and well (or pitfall trap) that extends about the center well. Typically, the outer wall is vertical or so steep that many of the bed bugs may not be able, or will stop trying, to climb this outer wall. Hence, the "trap" may act more as a barrier than a trap and provide a false negative result indicating that few or no bed bugs are present in a room as the bed bugs look for other ways onto the bed or for other prey in adjacent rooms or parts of a building (e.g., the next apartment or hotel room).

Another type of bed bug monitor or trap has been produced that attempts to provide better monitoring of bed bugs by concurrently using multiple lures. These multi-lure traps include a carbon dioxide source and a release mechanism to periodically release carbon dioxide to mimic breathing of a blood host (a sleeping human). Additionally, a multi-lure trap may function to release host odor attractants (e.g., kairomones) to attract the bed bugs by their sense of smell or detection of particular chemicals associated with a host. Further, the multi-lure trap may include a heat source to provide warmth similar to that provided by a human host. In one exemplary multi-lure trap, a sloped climbing surface made of a felt-covered plastic ramp is provided that gives any attracted bed bugs a ramp to the three lures, and the end of the ramp provides a sharp edge drop off into a pitfall trap (e.g., a well or pit with four vertical walls and a base mating with the top of the angled ramp). Bed bugs that fall into the pit or well typically have trouble climbing back out of the steep well or pit. The makers of these types of traps teach that bed bugs avoid sticky traps.

However, manufacturers of other personal bed bug monitors or traps have argued that insect traps for bed bugs do not need to use a carbon dioxide release device as this makes the device overly complex and does not add to its effectiveness. Further, these manufacturers stress the need for specific adhesives to retain or capture bed bugs once they fall into the pit or well. In other words, the trap designers recognized that bed bugs are very strong and able to climb out of many traps that are not "sticky" or even that do not use the correct adhesive to capture or trap the attracted bed bugs. These devices may be shaped like a small tray with a central heat or warmth lure (a heated dome) that is used to attract the bed bugs. A sloped side is provided to create a ramp leading bed bugs toward the warm dome/center portion, and a pit or well with walls/surfaces covered with an adhesive or sticky sidewalls are used to capture the bed bugs that crawl or fall into the pit surrounding the warm core/center. The adhesive surfaces have to be periodically replaced or maintained to allow continued use, which may be undesirable or impractical in some settings.

Existing insect traps have not met all the needs of consumers, and there remains a disagreement amongst manufacturers as how to best lure insects such as bed bugs to a trap and how to trap or retain the insects once they are in a well or pit. Hence, there is a need for new designs for insect traps that will assist in monitoring infestations of crawling (or non-flying and non-jumping) insects such as bed bugs and, in some applications, there is a desire for such traps to capture and also kill the attracted insects (e.g., to make disposal easier and to better ensure trapped insects do not escape).

SUMMARY

The present description describes an insect trap that facilitates detection of an infestation or presence of a variety of crawling insects (i.e., insects that are non-flying and, for the most part, non-jumping). For example, the insect trap is particularly suited for attracting, trapping, and exterminating parasitic insects found worldwide including, but not limited to, bed bugs. The insect trap includes a pit fall trap assembly or portion defining a pit or well into which crawling insects fall. The pit fall trap portion (or "tray") has sidewalls with sloped/angled inner surfaces that are treated to be slick or low fraction such that insects falling into the pit/well cannot escape (or at least have significant difficulty exiting the pit).

The pit fall trap portion further includes a heat source that acts first to provide warmth that aids in attracting the crawling insects and second to increase the temperature in the pit/well above a specified extermination temperature (or into a useful range) to kill the trapped insects. The insect trap may include a controller with a timer that functions to activate the heat source to operate in an attraction mode for a first time period and then to operated in an extermination mode for a second time period (e.g., a shorter time period than the first time period that is selected based on the extermination temperature and the species of the trapped insects). In many applications, the insect trap is used to monitor/exterminate nocturnal insects and may be operated from nightfall to about dawn (such as about 8 PM to about 7 AM or some other useful time period). The tray (or its pit/well) can be periodically inspected (e.g., each morning) to provide an indication or alarm regarding potential infestation and provide identification of the type of crawling insects present in a room in which the insect trap is positioned (e.g., near a bed in a bedroom or the like).

More particularly, an insect trap is provided for use in trapping and exterminating crawling insects including bed bugs. The trap includes a pit fall trap assembly with sidewalls defining a pit within the sidewalls (e.g., sidewalls extending up from a base to a height to define a pit with a depth of two to four times the length of a targeted crawling insect's body such as a pit 10 to 20 mm deep for a bed bug). The pit fall trap assembly further includes a heat source positioned within the pit. The trap further includes a controller assembly with a controller selectively operating the heat source.

In some embodiments of the insect trap, the heat source includes a base plate provided at a bottom of the pit adjacent to lower edges of inner surfaces of the sidewalls. In this way, the base plate provides the floor or lower surfaces of the pit upon which insects fall and also to which the insects are attracted by the thermal lure of the heat source. The inner surfaces preferably include a layer of anti-traction material (such as UHMW tape or the like) such that the insects cannot climb back out of the pit. Instead of being vertical (perpendicular to the base plate), the inner surfaces may be sloped at an angle, measured from vertical, of more than about 20 degrees (e.g., 45 to 70 degree downward sloping surface from the top of the sidewalls or the like). In some cases, the heat source further includes a resistive (or other) heat element contacting a surface of the base plate and operable by the controller to heat the base plate.

In some implementations of the insect trap, the controller operates to first heat portions of the heat source exposed to the pit to a first temperature within a lure temperature range for a first period of time and to second heat the exposed portions of the heat source to a second temperature within an extermination temperature range, and greater than the first temperature, for a second period of time. In such two-operating temperature range implementations, the lure temperature range may fall within the range of 85 to 100° F. and the extermination temperature range may include temperatures of at least about 113° F. Further, in such cases, the second period of time is typically at least about 7 minutes and is less than the first period of time. The controller may repeat the first and second heating operations of the heat source during an operating time period (such as during nighttime hours for nocturnal crawling insects).

In some embodiments, the insect trap includes a mechanism or assembly for selectively releasing carbon dioxide ($CO_2$) to further attract insects. Such a $CO_2$ release mechanism may be operated periodically by the controller to release volumes of $CO_2$ that mimic the breathing of a person during sleep (or other blood host/prey of the targeted insect). The $CO_2$ release point or outlet may be within or above (or adjacent) the pit provided by the insect trap such that insects attempting to reach the source of the $CO_2$ fall into the pit where they are trapped, as described above.

BRIEF DESCRIPTION OF THE DRAWINGS

FIG. 3 is a partial exploded view of the insect trap of FIG. 1 showing details of the tray or pit fall trap assembly in further detail including the anti-traction elements applied to the inner surfaces of the trap sidewalls and the

DETAILED DESCRIPTION OF THE PREFERRED EMBODIMENTS

Briefly, the following description describes an exemplary insect trap that is designed to attract crawling insects with a heat source that may operate to replicate warmth output from a blood host such as by providing temperatures in the range of human skin or some higher range (e.g., 85 to 100° F.). The insect trap includes a pit fall trap assembly (or tray) with a well or pit defined by vertical sidewalls, and the heat source is positioned within the well or pit such as at the base or floor of the well or pit.

The vertical sidewalls have sloped or angled outer surfaces, which may include a surface treatment (a particular surface roughness) or covering (such as a felt sheet or covering or other texturing element) to provide a crawling bug with traction to readily scale or climb up the sidewalls to approach the heat source. The tops of the sidewalls provide a landing or perch with a width great enough that the crawling bugs are able stop prior to falling into the pit/well (such as a width of 0.5 to 1 or more times the length of targeted insects), as such a landing seems to more effectively trap crawling insects when compared with a sharp peak or abrupt edge that is avoided by many insects.

The sidewalls further include sloped/angled inner surfaces extending downward into the pit/well such as to the top of the heat source. These surfaces are not vertical with the landing as such a drop off is also often avoided by a crawling insect. Instead, a slope of 30 to 60 degrees may be preferred (e.g., 45 to 55 degrees or the like) to attract more insects. Significantly, though, the inner wall surfaces are covered or treated to be slippery or to have little or no traction for a crawling insect such as with a covering or anti-traction element applied over the entirety of the inner surfaces (e.g., a slick tape or the like).

During operation, the heat source may be periodically operated to raise the temperatures in the trap or pit into an extermination temperature range or above some preset minimum extermination temperature for a period of time to kill the trapped insects. For example, the thermal death point of a bed bug is about 113° F. with most stages of this insect being killed by about 7 minutes of exposure to 115° F. With this in mind, the heat source may be operated to ramp up to some higher temperature setting (such as about 125° F.) for some preset time period (such as 15 to 30 minutes) to cause the lower portions of the pit or well containing the trapped insects to be heated to 113° F. or higher for more than 7 minutes and exterminate the trapped insects.

Figure 1:
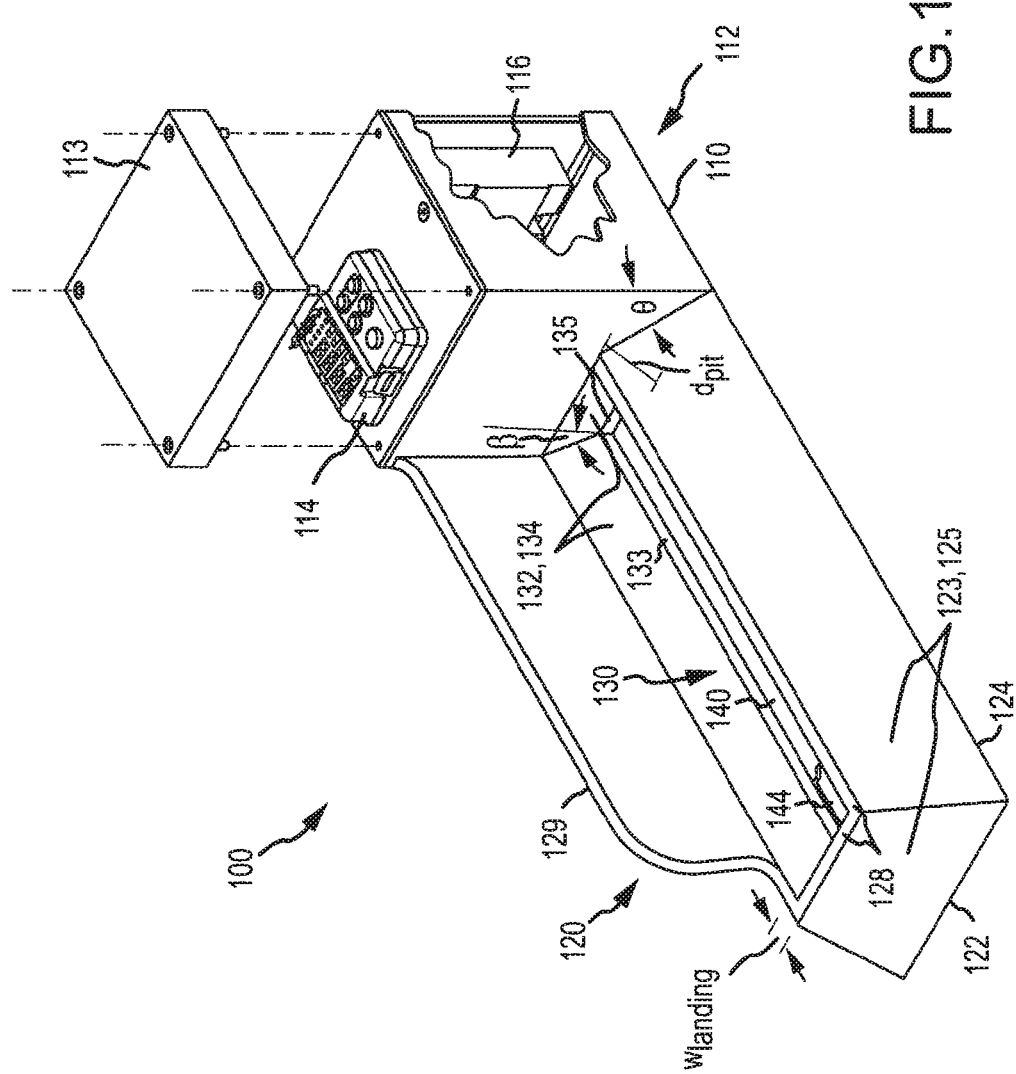
FIG. 1 is a front perspective view of an insect trap of the present description including cutaways to illustrate additional hidden features of the insect trap implementation.

FIG. 1 illustrates an isometric view of an insect trap 100 of an embodiment that may be used to monitor infestations of bed bugs or other crawling insects and to also exterminate trapped insects. The insect trap 100 generally is made up a controller assembly 110 and a pit trap assembly (or tray portion) 120. The controller assembly 110 includes a housing 112 that may take the form of a plastic (or other material) box with four sidewalls, a lower base, an upper platform, and cover 113. A power relay 116 may be mounted on one of the sidewalls of the housing 112. A controller 114 may be positioned on the upper platform of the housing 112, and the controller 114 may be accessed by removal of the cover 113.

The controller 114 may be adapted to provide a timer for selectively providing power to a heat source (e.g., heat strip/element 144) in the pit fall trap assembly 120 and for setting the temperature of the heat source at various periods of operation. A user of the insect trap 100 may use the default settings provided with a controller 114 or make adjustments to the timer settings and/or temperature settings by operating the controller 114. For example, the operator may set time of operation of the insect trap 100 (e.g., a start time and a stop time that may coincide with night time at the use location for the trap 100). Also, the user may adjust or select the attraction temperature (or lower/first temperature) setting of the insect trap 100 used to attract insects and/or adjust or select the extermination temperature (or higher/second temperature) setting of the insect trap 100 used to kill trapped insects.

As shown, the controller assembly 110 is coupled to the pit fall trap assembly 120, which is configured to define a pit fall or well 130 for attracting and then trapping crawling insects. To this end, the pit fall trap assembly 120 includes sidewalls 122, 124 that may be considered vertical walls extending up from a base up to a particular height (such as 0.5 to 3 inches or the like) and arranged so as to define a particular shape of a pit or well 130. The pit 130 has a depth, $d_{Pit}$, (as measured as the vertical height from the top of base plate or trap floor 140) chosen to receive a large number of insects and to retain or trap the insects entering/falling into the pit 130 (e.g., a depth of at least about 2 times an insect's body length such as 10 mm or more when the targeted insect is a bed bug). The pit 130 shown is rectangular in shape, but other shapes may be useful as well such as a square or a circle. Depending upon the length and configuration of the trap well 130 (e.g., 3 to 12 inches or more in length as measured from the housing 112), a structural sideboard 129 may be provided that extends outward from the housing 112 of the controller assembly 110 along a top edge of a sidewall 124.

Each of the sidewalls 122, 124 (three in this example trap 100 with the second endwall provided by a mating wall of housing 112) includes an outer surface 123, 125 that is adapted to allow ready or inviting access by crawling insects to the pit or well 130 of the trap assembly 120. Instead of being a perpendicular surface (which may deter crawling insects and lead to failed detection of an infestation), the outer surfaces 123, 125 are angled or sloped upward toward the top landing 128 above the pit 130. This is shown by access angle, θ, that may be chosen to suit the target insect and traction of surfaces 123, 125 (steeper angle acceptable if better traction provided), with ranges of 15 to 70° being useful and about 45° being shown in trap 100.

It may be desirable in some applications for the surfaces to be have a particular roughness and/or material to provide a high traction entry up to the landing/edge 128. This may be provided by manufacturing processes to roughen the otherwise smooth outer surfaces 123, 125. In other cases, though, a sheet or layer of traction material such as a felt sheet or the like is applied to the outer sloped surfaces 123, 125 of sidewalls 122, 124. This traction sheet allows a typical crawling insect to quickly and easily approach the thermal or heat lure in the trap assembly 120 as they provide climbing surfaces into the pit or well 130.

The climbing surfaces provided by outer surfaces 123, 125 end at a landing or perch 128 provided at the top of each sidewall 122, 124. The landing 128 is typically not a mere point or sharp transition into the pit or well 130. Instead, the landing 128 has a width, $W_{Landing}$, that is great enough to allow a targeted crawling insect to stop/rest at the end of the crawling or outer surface 123, 125 and inspect the pit 130. Many crawling insects will avoid sharp edges that do not provide the opportunity to sense or inspect the opposite side. Hence, the landing 128 may be a level or horizontal surface (parallel to the floor or mounting surface of the trap 100) that has a width, $W_{Landing}$, that is in the range of 0.5 to 2 times that of the targeted insect's body length or 2 to 10 mm or greater for a common bed bug. In some cases, the insects on the ledge or landing 128 will sense a combination of the thermal lure (which mimics a blood host in some embodiments) and the presence of other insects within the pit 130 and will be enticed to enter the pit 130.

Adjacent to or abutting the landing 128, the pit fall trap assembly 120 includes inner surfaces 132, 134 that lead downward into the pit 130. The inner surfaces 132, 134 of the sidewalls 122, 124 are typically sloped, but may be perpendicular in some cases, to encourage the crawling insects to enter the pit 130 (rather than turning away from, a sharp drop provided by a perpendicular face). As shown, the inner surfaces 132, 134 are angled or sloped downward into the pit 130 at a pit side angle, β, that may be relatively steep such as 30 to 75 degrees as measured from vertical with 45 degrees shown as a non-limiting example.

Significantly, the inner surfaces 132, 134 are preferably designed to be slick or slippery so as to provide no or little traction for a crawling insect. In this way, the inner surfaces 132, 134 may be thought of as anti-traction or low traction surfaces that cause the insect leaving the landing 128 and entering the pit 130 to slide or slip down (or "fall") into the depths of the pit 130. Further, the insects are then trapped as they cannot gain traction or grip to crawl back out or exit the pit 130 based on a combination of the low traction and the relatively steep pit side angle, β (e.g., the lower the traction provided the smaller pit side angle, β, may be and vice versa to retain insects in the pit 130).

Perpendicular sidewall surfaces 133, 135 may be provided at the lower edges of the surfaces to define an opening to the thermal lure or heat source positioned at the bottom of the trap or well 130, and the lower surfaces 133, 135 further make it difficult for insects to crawl out of the pit 130 (e.g., may have a height of about the length of the insect body such as 4 to 6 mm for a bed bug trap 100). These surfaces typically are not treated with anti-traction materials due to their proximity to the heat source.

A number of surface treatments and coverings may be used to obtain the desired level of (or absence of) traction. One embodiment of trap 100 utilizes a slick tape to provide the surfaces 132, 134 such as a tape formed using ultra high molecular weight polyethylene (UHMW) (e.g., UHMW Slick Tape by Peachtree or the like), and such slick tape or other surface treatment typically would cover all of the surfaces 132, 134 to avoid creating any exits routes for the trapped insects.

As discussed above, the pit fall trap assembly 120 includes a thermal lure to attract insects with temperatures in ranges similar to that of blood hosts (e.g., a human in the case of bed bugs). Significantly, the thermal lure is positioned within the pit 130 of the assembly 120 at the base or bottom of the pit 130, which better attracts insects into the pit 130 and also allows the thermal lure to provide the second function of exterminating insects in the pit 130 as discussed below.

The thermal lure of trap assembly 120 is provided by the combination of a base plate or pit floor element 140 and a heat element or strip 144. The base plate extends along the bottom edge of the slipper inner surfaces 132, 134 (adjacent lower 133, 135) such that insects slide down onto or fall onto the upper or exposed surface of the base plate 140. The base plate 140 is shown to be rectangular in shape, but may take nearly any shape to suit or match the opening defined by the lower surfaces 133, 135 (or bottom edges of inner surfaces 132, 134). In some embodiments, the base plate 140 takes the form of a plate or bar made of a metal or other material with a high thermal conductivity that can easily be heated (and cooled) to provide a particular heat source (thermal lure or extermination heat element) with a temperature in a desired range. For example, the trap 100 may use a thin (e.g., 0.05 to 0.1 inch thick) bar or sheet of aluminum (for its corrosion resistance) for plate 140.

The heat element or strip 144 is positioned near the base plate 140 and functions to control the temperature of the base plate 140 during operation of the insect trap 100. Typically, the heat element 144, which may be a silicon strip heater with a built in thermocouple or the like, is positioned to contact the bottom (and/or sides) of the base plate 140 to effectively transfer heat to the plate 140. In some cases, the heat element 144 has a shape and size similar to that of the plate 140 such that the heat transfer surface is maximized.

The heat element 144 is selectively powered (operated) by the controller 114 to provide two heating levels: a first level that raises the temperature of the base plate 140 into a thermal lure range (e.g., 85 to 100° F. or the like depending on the targeted insect) and a second level that raises the temperature of the base plate 140 into an insect extermination range (e.g., 110 to 130° F. or the like depending on the targeted insect with 115 to 125° F. being useful for bed bugs). Typically, the heat source provided by the plate 140 and heat element 144 is alternatively operated in these two modes with the attraction or lure mode being longer than the extermination mode. For example, the trap 100 may be operated during the night for nocturnal insects (e.g., from about 10 PM to 6 AM), and alternate between 2 to 3 hours of attraction mode (lower temperature range for base plate 140 to mimic heat/warmth provided by a blood host) and 7 to 30 minutes of extermination mode (higher temperature range for base plate 140 to kill trapped insects in the pit and on or near the upper surface of the base plate 140).

Figure 2:
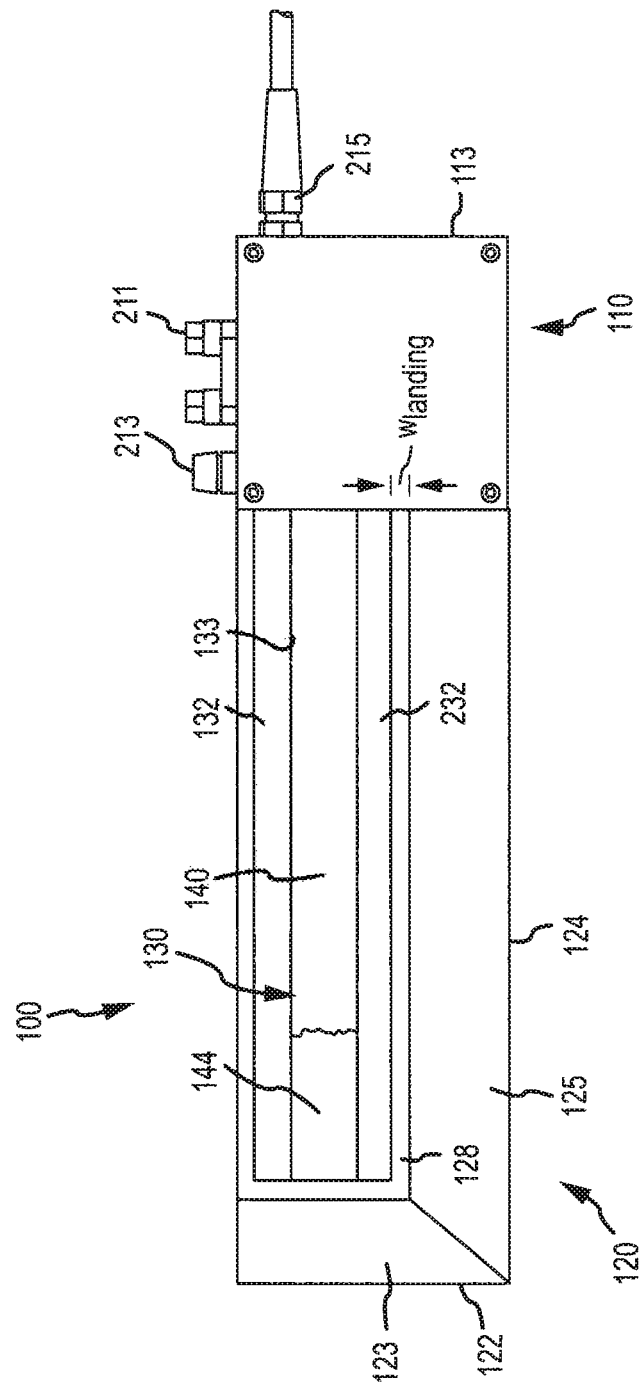
FIG. 2 is a top view of the insect trap of FIG. 1.

FIG. 2 provides a top view of the insect trap 100 shown in FIG. 1. As shown, power is provided with a power cord 215 attached to the side of the housing 112 of controller assembly 110. For example, 110 VAC power may be provided to relay 116. One or more fuses 213 may be provided in the controller assembly 110, and power from the relay 116 may be provided to the controller 114. Further, the controller assembly 110 may include input 211 for a DC power supply for the heat strip/element 144, for example.

The particular power supplies and configuration of the controller 114 are not limiting to the insect trap 100 as long as the functionality described herein is achieved including operating at two differing temperature levels/ranges for two like or differing time periods to attract and exterminate crawling insects. At this point, it may be useful to describe one exemplary, but not limiting, method of operating the insect trap 100 via the controller 114 and power sources provided to heat element 144 to heat base plate 140.

During a typical use, the insect trap 100 is plugged into a wall socket or other power source using power cord 215. The controller 114 may have default operating settings (that may, optionally, be modified/adjusted by a user via controller 114 interfaces) that cause it to use the heat element 144 to heat the base plate 140 to an attraction temperature (e.g., 98.6° F.) beginning at a start time (e.g., 10 PM). After completion of a thermal attraction period (e.g., 3 hours), the controller 114 acts to operate the heat element 144 to ramp up the heat in the pit 130 by heating the plate 140 up to an extermination temperature (e.g., 125° F.), which is held or maintained for an extermination period (e.g., 30 minutes). Then, the controller 114 initiates a next thermal attraction period by reducing the heat in the pit 130 by lowering the temperature of the base plate 140 via operation of heat element 144 back down to the attraction or thermal luring temperature range (or set point). This process is repeated during the operation of the insect trap 100 such as until a preset stop time (e.g., 6 AM).

As viewed from above in FIG. 2, it can be seen that the felt or other traction-providing material (or surface treatment) on the outer surfaces 123, 125 of sidewalls 122, 124 acts as a "carpeted" or high traction access surface for the crawling insects attracted by the warmth output by the base plate 140 in the pit 130. The landing 128 is at the top of the sloped, carpeted surfaces 123, 125 and provides a "safe" location for the insects to inspect the pit 130 and base plate 140. The sloped inner surfaces 132, 232 provide a gentle appearing approach to the base plate (thermal lure) 140, but the anti-traction or slippery nature of the surfaces 132, 232 causes the insects to fall down into the pit 130 onto an upper, exposed surface of the base plate 140. The anti-traction nature of the surfaces 132, 232 (such as UHMW tape or the like) prevents the insects from gaining traction and escaping the pit 130, where they are exterminated when the base plate 140 is later heated to a temperature in the extermination temperature range (e.g., 113 to 135° F. for bed bugs) by use of the heat element 144. As discussed above, the slippery surfaces are arranged to extend about the periphery of the base plate 140 to eliminate any exits for trapped insects.

FIG. 3 provides a partially exploded view of the insect trap 100 showing additional details that may be hidden in FIGS. 1 and 2. For example, an opening may be provided in sidewall/endwall 122 for inserting the base plate 140 and then later removing it to facilitate cleaning, replacement, or other maintenance. As shown, the heat element 144 is shaped similarly to the base element 140 (a flat plate or strip) and may be plugged into receptacles of the controller assembly 110 via plugs 341 in one end so as to be selectively heated (e.g., a resistive heater or the like may be used in trap 100).

In this embodiment, the anti-traction aspect of the insect trap 100 is provided by anti-traction elements 132 and 232 that may take the form of UHMW tape or a similar coating element. The anti-traction elements or surfaces 132, 232 are applied (e.g., self-adhesive tape or the like) to sloped inner faces 331, 333 of the sidewalls 122, 124 defining the pit or well 130.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An insect trap for use in trapping and exterminating crawling insects, comprising:
   a pit fall trap assembly including sidewalls defining a pit within the sidewalls, wherein the pit fall trap assembly further includes a heat source positioned within the pit; and
   a controller assembly with a controller selectively operating the heat source,
   wherein the heat source comprises a base plate provided at a bottom of the sit adjacent to lower edges of inner surfaces of the sidewalls, and
   wherein the inner surfaces comprise a layer of anti-traction material.

2. The insect trap of claim 1, wherein the inner surfaces are sloped at an angle, measured from vertical, of more than about 20 degrees.

3. The insect trap of claim 1, wherein the heat source further comprises a resistive heat element contacting a surface of the base plate and operable by the controller to heat the base plate.

4. The insect trap of claim 1, wherein the controller operates to first heat portions of the heat source exposed to the pit to a first temperature within a lure temperature range for a first period of time and to second heat the exposed portions of the heat source to a second temperature within an extermination temperature range, and greater than the first temperature, for a second period of time.

5. The insect trap of claim 4, wherein the lure temperature range falls within the range of 85 to 100° F.

6. The insect trap of claim 4, wherein the extermination temperature range includes temperatures greater than about 113° F.

7. The insect trap of claim 4, wherein the second period of time is at least about 7 minutes and is less than the first period of time and wherein the controller repeats the first and second heating operations of the heat source during an operating time period.

8. A pitfall trap apparatus, comprising:
a base plate;
sidewalls extending about the periphery of the base plate to define a well with a predefined depth,
wherein the sidewalls each have an inner surface extending from an upper edge toward the base plate, wherein the inner surfaces are low traction surfaces, and wherein the inner surfaces each slopes downward from the upper edge at a pit side angle, as measured from horizontal, in the range of 30 to 75 degrees.

9. The apparatus of claim 8, further comprising a heat element abutting a lower surface of the base plate and operating to heat an upper surface of the base plate to a temperature for at least about 85° F., whereby the base plate acts as a thermal lure for parasitic insects.

10. The apparatus of claim 9, wherein the heat element second operates to heat the upper surface of the base plate to a temperature of at least about 113° F. for at least about 7 minutes, whereby the base plate acts as an extermination element for exterminating insects proximate to the upper surface.

11. The apparatus of claim 8, wherein the inner surfaces each comprises a layer of ultra high molecular weight polyethylene.

12. The apparatus of claim 8, wherein at least a portion of the sidewalls includes an outer surface sloping downward from the upper edge at an angle in the range of 20 to 70 degrees and wherein the outer surfaces are textured to provide high traction surfaces for crawling insects.

13. The apparatus of claim 8, the upper edge of each of the sidewalls is a substantially horizontal and planar surface with a width of at least about 2 millimeters.

14. An insect trap, comprising:
sidewalls with sloped outer surface and sloped inner surfaces, the inner surfaces extending downward to lower edges;
a landing provided on a top edge of each of the sidewalls extending between upper edges of the outer and inner surfaces, the landing having a width greater than about 2 millimeters; and
a heat source positioned proximate to the lower edges of the sidewalls,
wherein the inner surfaces are sloped inward, as measured from vertical, at an angle of at least about 20 degrees, and
wherein the inner surfaces comprises a layer of anti-traction material.

15. The insect trap of claim 14, further comprising a controller operating the heat source in an alternating manner between a thermal lure mode to raise a pit floor surface proximate to the lower edges to a temperature in a range of 85 to 100° F. and an exterminating mode to raise the pit floor surface to a temperature in a range of 110 to 135° F.

16. A pitfall trap apparatus, comprising:
a base plate;
sidewalls extending about the periphery of the base plate to define a well with a predefined depth,
wherein the sidewalls each have an inner surface extending from an upper edge toward the base plate, wherein the inner surfaces are low traction surfaces, wherein the inner surfaces each slopes downward from the upper edge at a pit side angle, as measured from horizontal, in the range of 30 to 75 degrees, and wherein the inner surfaces each comprises a layer of ultra high molecular weight polyethylene.

* * * * *

UNITED STATES PATENT AND TRADEMARK OFFICE
CERTIFICATE OF CORRECTION

PATENT NO. : 8,973,300 B1
APPLICATION NO. : 13/443091
DATED : March 10, 2015
INVENTOR(S) : John Douglas Smith et al.

It is certified that error appears in the above-identified patent and that said Letters Patent is hereby corrected as shown below:

In the Specification

Column 2, line 47, delete "fraction" and insert therefor --traction--.

In the Claims

Column 8, line 50, Claim 1, delete "sit" and insert therefor --pit--.

Signed and Sealed this
Thirtieth Day of June, 2015

Michelle K. Lee
*Director of the United States Patent and Trademark Office*